(12) United States Patent
Trubin et al.

(10) Patent No.: US 11,243,863 B2
(45) Date of Patent: Feb. 8, 2022

(54) SYSTEMS AND METHODS FOR MODELING COMPUTER RESOURCE MEIRICS

(71) Applicant: Capital One Services, LLC, McLean, VA (US)

(72) Inventors: Igor Trubin, Glen Allen, VA (US); Mark Schutt, Chesterfield, VA (US); Jeffery Robinson, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 202 days.

(21) Appl. No.: 16/549,770

(22) Filed: Aug. 23, 2019

(65) Prior Publication Data

US 2019/0377653 A1    Dec. 12, 2019

Related U.S. Application Data

(63) Continuation of application No. 15/184,501, filed on Jun. 16, 2016, now Pat. No. 10,437,697.
(Continued)

(51) Int. Cl.
*G06F 11/34* (2006.01)
*G06Q 10/06* (2012.01)

(52) U.S. Cl.
CPC ...... *G06F 11/3442* (2013.01); *G06F 11/3452* (2013.01); *G06Q 10/067* (2013.01)

(58) Field of Classification Search
CPC ............ G06F 11/3442; G06F 11/3452; G06Q 10/067
See application file for complete search history.

(56) References Cited

U.S. PATENT DOCUMENTS

| 6,564,174 B1 * | 5/2003 | Ding | G06Q 10/06 |
| | | | 702/186 |
| 6,721,713 B1 * | 4/2004 | Guheen | G06Q 50/01 |
| | | | 705/1.1 |

(Continued)

OTHER PUBLICATIONS

Zhang, Q., et al. "A Regression-Based Analytic Model for Dynamic Resource Provisioning of Multi-Tier Applications" IEEE 4th Int'l Conf. on Autonomic Computing, ICAC'07 (2007) (Year: 2007).*

(Continued)

*Primary Examiner* — Jay Hann
(74) *Attorney, Agent, or Firm* — Finnegan, Henderson, Farabow, Garrett & Dunner, LLP

(57) ABSTRACT

This disclosure relates generally to system modeling, and more particularly to systems and methods for modeling computer resource metrics. In one embodiment, a processor-implemented computer resource metric modeling method is disclosed. The method may include detecting one or more statistical trends in aggregated interaction data for one or more interaction types, and mapping each interaction type to one or more devices facilitating the transactions. The method may further include generating one or more linear regression models of a relationship between device utilization and interaction volume, and calculating one or more diagnostic statistics for the one or more linear regression models. A subset of the linear regression models may be filtered out based on the one or more diagnostic statistics. One or more forecasts may be generated using the remaining linear regression models, using which a report may be generated and provided.

20 Claims, 16 Drawing Sheets

Related U.S. Application Data

(60) Provisional application No. 62/180,777, filed on Jun. 17, 2015.

(56) References Cited

U.S. PATENT DOCUMENTS

| | | | |
|---|---|---|---|
| 7,028,301 | B2 | 4/2006 | Ding |
| 7,552,208 | B2 | 6/2009 | Lubrecht |
| 7,698,111 | B2 | 4/2010 | Abrahao |
| 8,015,454 | B1 | 9/2011 | Harrison |
| 8,326,970 | B2 * | 12/2012 | Cherkasova ........... G06Q 10/06 709/224 |
| 8,355,938 | B2 | 1/2013 | Gilpin |
| 10,803,397 | B2 * | 10/2020 | Desikachari ..... G06Q 10/06315 |
| 2007/0192254 | A1 * | 8/2007 | Hinkle ................... G06Q 99/00 705/51 |
| 2015/0244645 | A1 * | 8/2015 | Lindo ................... G06F 9/5011 709/224 |

OTHER PUBLICATIONS

Mi, N., et al. "Analysis of Application Performance and its Change via Representative Application Signatures" IEEE Network Operations & Management Symposium, pp. 216-223 (2008) available from <https://ieeexplore.ieee.org/abstract/document/4575137> (Year: 2008).*

Pang, J. "Characterizing User Workload for Capacity Planning" Thesis, U. British Columbia (1986) (Year: 1986).*

Jeffrey Buzen and Annie Shum: "MASF—Multivariate Adaptive Statistical Filtering," Proceedings of the Computer Measurement Group, pp. 1-10, (Jan. 1995).

Kevin McLaughlin and Igor Trubin, "Exception Detection System, Based on the Statistical Process Control Concept," Proceedings of the Computer Measurement Group (2001).

Igor Trubin, "Exception Based Modeling and Forecasting," Proceedings of the Computer Measurement Group, pp. 1-11 (Jan. 2008).

Igor Trubin, "System Management by Exception: SETDS Methodology," http://itrubin.blogpost.com/2012/11/setds-methodology-cmg12-speech.html (Nov. 20, 2012).

Bankole, A., et al. "Predicting Cloud Resource Provisioning Using Machine Learning Techniques" 2013 26$^{th}$ IEEE Canadian Conf. Electrical & Computer Engineering (2013).

Trubin, I., "Disk Subsystem Capacity Management, Based on Business Drivers, I/O Performance Metrics and MASF" Computer Management Group's 2003 Int'l Conf. (2003).

Trubin, I., "Disk Subsystem Capacity Management, Based on Business Drivers, I/O Performance Metrics and MASF" CapitalOne Powerpoint Presentation (2004).

Trubin, I, "Exception Based Modeling and Forecasting" (2008).

* cited by examiner

400

| Transaction Type | Date | Hour | Count | Data Source |
|---|---|---|---|---|
| BANK-ATM-1 | 3/11/2015 | 1 | 1297 | cam_bank_prod1 |
| BANK-ATM-1 | 3/11/2015 | 2 | 834 | cam_bank_prod1 |
| BANK-ATM-1 | 3/11/2015 | 3 | 578 | cam_bank_prod1 |
| BANK-ATM-1 | 3/11/2015 | 4 | 479 | cam_bank_prod1 |
| BANK-ATM-1 | 3/11/2015 | 5 | 762 | cam_bank_prod1 |
| BANK-ATM-1 | 3/11/2015 | 6 | 1732 | cam_bank_prod1 |
| BANK-ATM-1 | 3/11/2015 | 7 | 3246 | cam_bank_prod1 |
| BANK-ATM-1 | 3/11/2015 | 8 | 5287 | cam_bank_prod1 |
| BANK-ATM-1 | 3/11/2015 | 9 | 6886 | cam_bank_prod1 |
| BANK-ATM-1 | 3/11/2015 | 10 | 7989 | cam_bank_prod1 |
| BANK-ATM-1 | 3/11/2015 | 11 | 8959 | cam_bank_prod1 |
| BANK-ATM-1 | 3/11/2015 | 12 | 10839 | cam_bank_prod1 |
| BANK-ATM-1 | 3/11/2015 | 13 | 12484 | cam_bank_prod1 |
| BANK-ATM-1 | 3/11/2015 | 14 | 12098 | cam_bank_prod1 |
| BANK-ATM-1 | 3/11/2015 | 15 | 11494 | cam_bank_prod1 |
| BANK-ATM-1 | 3/11/2015 | 16 | 11880 | cam_bank_prod1 |
| BANK-ATM-1 | 3/11/2015 | 17 | 12985 | cam_bank_prod1 |
| BANK-ATM-1 | 3/11/2015 | 18 | 13463 | cam_bank_prod1 |
| BANK-ATM-1 | 3/11/2015 | 19 | 12423 | cam_bank_prod1 |
| BANK-ATM-1 | 3/11/2015 | 20 | 10027 | cam_bank_prod1 |
| BANK-ATM-1 | 3/11/2015 | 21 | 6983 | cam_bank_prod1 |
| BANK-ATM-1 | 3/11/2015 | 22 | 4988 | cam_bank_prod1 |
| BANK-ATM-1 | 3/11/2015 | 23 | 3371 | cam_bank_prod1 |
| BANK-ATM-1 | 3/11/2015 | 24 | 2165 | cam_bank_prod1 |

| Transaction Type | Date | Hour | Count | Data Source |
|---|---|---|---|---|
| C1360-MOB-LOGIN | 3/12/2015 | 1 | 3431 | cam_c1360_prod |
| C1360-MOB-LOGIN | 3/12/2015 | 2 | 2437 | cam_c1360_prod |
| C1360-MOB-LOGIN | 3/12/2015 | 3 | 1822 | cam_c1360_prod |
| C1360-MOB-LOGIN | 3/12/2015 | 4 | 1375 | cam_c1360_prod |
| C1360-MOB-LOGIN | 3/12/2015 | 5 | 1361 | cam_c1360_prod |
| C1360-MOB-LOGIN | 3/12/2015 | 6 | 2160 | cam_c1360_prod |
| C1360-MOB-LOGIN | 3/12/2015 | 7 | 4403 | cam_c1360_prod |
| C1360-MOB-LOGIN | 3/12/2015 | 8 | 6558 | cam_c1360_prod |
| C1360-MOB-LOGIN | 3/12/2015 | 9 | 6908 | cam_c1360_prod |
| C1360-MOB-LOGIN | 3/12/2015 | 10 | 6712 | cam_c1360_prod |
| C1360-MOB-LOGIN | 3/12/2015 | 11 | 6624 | cam_c1360_prod |
| C1360-MOB-LOGIN | 3/12/2015 | 12 | 6334 | cam_c1360_prod |
| C1360-MOB-LOGIN | 3/12/2015 | 13 | 6288 | cam_c1360_prod |
| C1360-MOB-LOGIN | 3/12/2015 | 14 | 6034 | cam_c1360_prod |
| C1360-MOB-LOGIN | 3/12/2015 | 15 | 6066 | cam_c1360_prod |
| C1360-MOB-LOGIN | 3/12/2015 | 16 | 6037 | cam_c1360_prod |
| C1360-MOB-LOGIN | 3/12/2015 | 17 | 6176 | cam_c1360_prod |
| C1360-MOB-LOGIN | 3/12/2015 | 18 | 6306 | cam_c1360_prod |
| C1360-MOB-LOGIN | 3/12/2015 | 19 | 6438 | cam_c1360_prod |
| C1360-MOB-LOGIN | 3/12/2015 | 20 | 6427 | cam_c1360_prod |
| C1360-MOB-LOGIN | 3/12/2015 | 21 | 6565 | cam_c1360_prod |
| C1360-MOB-LOGIN | 3/12/2015 | 22 | 6313 | cam_c1360_prod |
| C1360-MOB-LOGIN | 3/12/2015 | 23 | 5717 | cam_c1360_prod |
| C1360-MOB-LOGIN | 3/12/2015 | 24 | 4743 | cam_c1360_prod |

| | 510 | 520 | 530 |
|---|---|---|---|
| | Transaction Type | Device Name | Operating System |
| | BANK-BRANCH-BALINQ | jeremiah | Unix |
| | BANK-BRANCH-CASH | luwin | Unix |
| | BANK-BRANCH-CHECK | pssol | Oracle |
| | BANK-BRANCH-DEPOSIT_ACC | pssrpt | Oracle |
| | BANK-BRANCH-WITHDRAW | tpmgmt | Windows |
| | BANK-IP-BAL | tpprodapp4 | Unix |
| 540 | BANK-IP-LOG | tpmonitor | Windows |
| | BANK-WEB-10 | bosie2b | Unix |
| | BANK-WEB-OAO | kdcpmblrobo06 | Unix |
| | C1360-IBPHN-ACCESSACCT | bdrmnmssas1c1d3 | Windows |
| | C1360-IBPHN-APP | bdrmnlxdisb01 | Unix |
| | C1360-MOB-ACTVCARD | bdrmnlxtsc1p2 | Linux |
| | C1360-MOB-ACTVCARD | bdrmnlxtsc1p3 | Linux |
| | C1360-MOB-ACTVCARD | bdrmnlxtsc2p1 | Linux |
| | C1360-MOB-APP | bdrmnlxarch01 | Unix |
| | C1360-MOB-APP | bdrmnlxarch02 | Unix |
| | C1360-MOB-APP | bdrmnlxdisb01 | Unix |
| | C1360-MOB-CHECK | tpmonitor | Linux |
| 550 | C1360-MOB-CHECK | bdrmnlxtsc5p3 | Linux |
| | C1360-MOB-CHECK | bdrmnlxtsc6p1 | Linux |
| | C1360-MOB-CHECK | bdrmnlxtsc6p2 | Linux |
| | C1360-MOB-LOGIN | bdrmnmssas1c2d3 | Windows |
| | C1360-MOB-MAILCHK | bdrmnlxjbmsg07 | Unix |
| | C1360-MOB-P2P | bdrmnlxtsc4p1 | Linux |
| | C1360-WEB-ACTVCARD | bdrmnlxjbmsg07 | Unix |
| | C1360-WEB-APP | bdrmnlxarch01 | Unix |
| | C1360-WEB-BPAY | bdrmnlxjbmsg08 | Unix |

| Date/Time | CPU_load | CPU_load_max | CPU_Util | CPU_Util_max | CPU_Util_min |
|---|---|---|---|---|---|
| 9/23/2014 1:00 | 0.9117 | 1.8500 | 19.8571 | 58 | 5 |
| 9/23/2014 2:00 | 1.5017 | 1.8200 | 62.1429 | 63 | 62 |
| 9/23/2014 3:00 | 1.6550 | 2.1400 | 62.1667 | 63 | 62 |
| 9/23/2014 4:00 | 1.2833 | 2.0800 | 45.8571 | 62 | 4 |
| 9/23/2014 5:00 | 0.4517 | 0.8200 | 5.6667 | 10 | 4 |
| 9/23/2014 6:00 | 0.7350 | 1.1800 | 4.7143 | 9 | 4 |
| 9/23/2014 7:00 | 0.8920 | 1.2600 | 2.0000 | 3 | 1 |
| 9/23/2014 8:00 | 1.0117 | 1.3200 | 3.0000 | 10 | 2 |
| 9/23/2014 9:00 | 0.6700 | 1.1100 | 3.0000 | 7 | 2 |
| 9/23/2014 10:00 | 0.6267 | 0.8300 | 3.1429 | 7 | 2 |
| 9/23/2014 11:00 | 0.6983 | 1.0800 | 2.3750 | 3 | 2 |
| 9/23/2014 12:00 | 0.7800 | 1.1900 | 1.5714 | 2 | 1 |
| 9/23/2014 13:00 | 0.8950 | 1.1700 | 5.5714 | 11 | 1 |
| 9/23/2014 14:00 | 0.6683 | 1.1900 | 6.8571 | 14 | 3 |
| 9/23/2014 15:00 | 1.0500 | 1.2600 | 6.0000 | 6 | 6 |
| 9/23/2014 16:00 | 0.7500 | 1.2800 | 6.6250 | 10 | 6 |
| 9/23/2014 17:00 | 0.8600 | 1.0000 | 4.5714 | 8 | 3 |
| 9/23/2014 18:00 | 0.8067 | 1.1600 | 4.2500 | 9 | 3 |
| 9/23/2014 19:00 | 0.8967 | 1.6200 | 7.7500 | 30 | 2 |
| 9/23/2014 20:00 | 0.7400 | 0.8800 | 7.8333 | 19 | 5 |
| 9/23/2014 21:00 | 0.6967 | 0.9900 | 6.5000 | 11 | 5 |
| 9/23/2014 22:00 | 1.5067 | 2.4700 | 29.3333 | 61 | 4 |
| 9/23/2014 23:00 | 0.4000 | 0.5600 | 4.7143 | 11 | 3 |
| 9/24/2014 0:00 | 0.6933 | 1.1400 | 4.1429 | 8 | 2 |

| | | | | | |
|---|---|---|---|---|---|
| 622 | 624 | 626 | 628 | 630 | 632 |
| Date/Time | Disk_IOs | Disk_Queue | Disk_Queue_Max | Disk_busy_pct | Disk_busy_pct_max |
| 9/23/2014 1:00 | 0 | 0 | 0 | 0 | 0 |
| 9/23/2014 2:00 | 4.8790 | 0.005 | 0.039 | 0.4995 | 3.9380 |
| 9/23/2014 3:00 | 0 | 0 | 0 | 0 | 0 |
| 9/23/2014 4:00 | 0.0018 | 0 | 0 | 0.0125 | 0.0010 |
| 9/23/2014 5:00 | 0 | 0 | 0 | 0 | 0 |
| 9/23/2014 6:00 | 0 | 0 | 0 | 0 | 0 |
| 9/23/2014 7:00 | 0 | 0 | 0 | 0 | 0 |
| 9/23/2014 8:00 | 0 | 0 | 0 | 0 | 0 |
| 9/23/2014 9:00 | 0.0048 | 0 | 0 | 0.0005 | 0.0050 |
| 9/23/2014 10:00 | 0.0003 | 0 | 0 | 0 | 0 |
| 9/23/2014 11:00 | 0 | 0 | 0 | 0 | 0 |
| 9/23/2014 12:00 | 0 | 0 | 0 | 0 | 0 |
| 9/23/2014 13:00 | 0 | 0 | 0 | 0 | 0 |
| 9/23/2014 14:00 | 0 | 0 | 0 | 0 | 0 |
| 9/23/2014 15:00 | 0 | 0 | 0 | 0 | 0 |
| 9/23/2014 16:00 | 0 | 0 | 0 | 0 | 0 |
| 9/23/2014 17:00 | 0 | 0 | 0 | 0 | 0 |
| 9/23/2014 18:00 | 0 | 0 | 0 | 0 | 0 |
| 9/23/2014 19:00 | 0 | 0 | 0 | 0 | 0 |
| 9/23/2014 20:00 | 0 | 0 | 0 | 0 | 0 |
| 9/23/2014 21:00 | 0 | 0 | 0 | 0 | 0 |
| 9/23/2014 22:00 | 0 | 0 | 0 | 0 | 0 |
| 9/23/2014 23:00 | 0 | 0 | 0 | 0 | 0 |
| 9/24/2014 0:00 | 0 | 0 | 0 | 0 | 0 |

| Date/Time | Mem_page | Mem_page_max | Mem_Util | Mem_Util_max |
|---|---|---|---|---|
| 9/23/2014 1:00 | 1.5057 | 3.5980 | 17.8233 | 17.8420 |
| 9/23/2014 2:00 | 21.6560 | 80.1520 | 20.4825 | 21.8800 |
| 9/23/2014 3:00 | 2.2022 | 5.4000 | 21.0367 | 21.3970 |
| 9/23/2014 4:00 | 192.1523 | 627.4200 | 21.0483 | 22.1570 |
| 9/23/2014 5:00 | 2.7137 | 10.3220 | 20.4750 | 20.8310 |
| 9/23/2014 6:00 | 4.2917 | 12.7300 | 20.7718 | 21.5440 |
| 9/23/2014 7:00 | 1.2177 | 3.3170 | 20.4807 | 20.8570 |
| 9/23/2014 8:00 | 2.1105 | 6.1700 | 20.4118 | 20.9040 |
| 9/23/2014 9:00 | 14.9320 | 54.5440 | 24.0962 | 42.5850 |
| 9/23/2014 10:00 | 19.8198 | 62.4210 | 20.7160 | 21.3430 |
| 9/23/2014 11:00 | 7.5512 | 15.7800 | 20.4113 | 21.0930 |
| 9/23/2014 12:00 | 2.1438 | 6.0050 | 20.7673 | 21.4420 |
| 9/23/2014 13:00 | 1.3457 | 3.2070 | 20.2182 | 20.5070 |
| 9/23/2014 14:00 | 2.2722 | 5.2830 | 20.3000 | 20.7110 |
| 9/23/2014 15:00 | 2.5873 | 8.6820 | 20.7460 | 21.1170 |
| 9/23/2014 16:00 | 7.2997 | 33.8270 | 20.7355 | 21.2930 |
| 9/23/2014 17:00 | 2.1665 | 6.1950 | 20.7328 | 21.3380 |
| 9/23/2014 18:00 | 2.6183 | 7.0650 | 20.0767 | 21.3160 |
| 9/23/2014 19:00 | 1.4303 | 3.2200 | 17.7717 | 17.7820 |
| 9/23/2014 20:00 | 1.7630 | 4.6980 | 17.7788 | 17.7890 |
| 9/23/2014 21:00 | 1.8822 | 3.4270 | 17.7322 | 17.7730 |
| 9/23/2014 22:00 | 1.2980 | 3.2730 | 17.7152 | 17.7300 |
| 9/23/2014 23:00 | 1.6265 | 3.4820 | 17.7183 | 17.7320 |
| 9/24/2014 0:00 | 2.1418 | 4.5680 | 17.7317 | 17.7440 |

652 — Date/Time; 654 — Mem_page; 656 — Mem_page_max; 658 — Mem_Util; 660 — Mem_Util_max

| Date/Time | Net_Byte_IOs | Net_queue | Net_queue_max |
|---|---|---|---|
| 9/23/2014 1:00 | 4016.0500 | 0.0000 | 0.0000 |
| 9/23/2014 2:00 | 4983.1278 | 0.0000 | 0.0000 |
| 9/23/2014 3:00 | 4854.4862 | 0.0000 | 0.0000 |
| 9/23/2014 4:00 | 387269.2695 | 0.1667 | 1.0000 |
| 9/23/2014 5:00 | 4547.3847 | 0.0000 | 0.0000 |
| 9/23/2014 6:00 | 5002.3248 | 0.0000 | 0.0000 |
| 9/23/2014 7:00 | 7391.3756 | 0.0000 | 0.0000 |
| 9/23/2014 8:00 | 4514.9600 | 0.0000 | 0.0000 |
| 9/23/2014 9:00 | 4603.4383 | 0.0000 | 0.0000 |
| 9/23/2014 10:00 | 5143.0372 | 0.0000 | 0.0000 |
| 9/23/2014 11:00 | 4622.1575 | 0.0000 | 0.0000 |
| 9/23/2014 12:00 | 4699.2628 | 0.0000 | 0.0000 |
| 9/23/2014 13:00 | 4601.8873 | 0.0000 | 0.0000 |
| 9/23/2014 14:00 | 4606.2320 | 0.0000 | 0.0000 |
| 9/23/2014 15:00 | 4712.4482 | 0.0000 | 0.0000 |
| 9/23/2014 16:00 | 4585.0650 | 0.0000 | 0.0000 |
| 9/23/2014 17:00 | 4722.6350 | 0.0000 | 0.0000 |
| 9/23/2014 18:00 | 4672.2102 | 0.0000 | 0.0000 |
| 9/23/2014 19:00 | 4215.6210 | 0.0000 | 0.0000 |
| 9/23/2014 20:00 | 4254.6972 | 0.0000 | 0.0000 |
| 9/23/2014 21:00 | 4310.9232 | 0.0000 | 0.0000 |
| 9/23/2014 22:00 | 4248.2330 | 0.0000 | 0.0000 |
| 9/23/2014 23:00 | 4212.4947 | 0.0000 | 0.0000 |
| 9/24/2014 0:00 | 4226.8177 | 0.0000 | 0.0000 |

550 { Device Name: tpmonitor
Transaction Type: C1360-MOB-CHECK
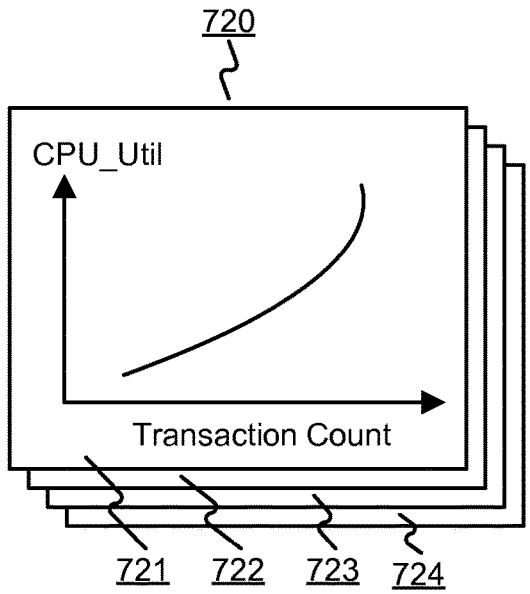
720
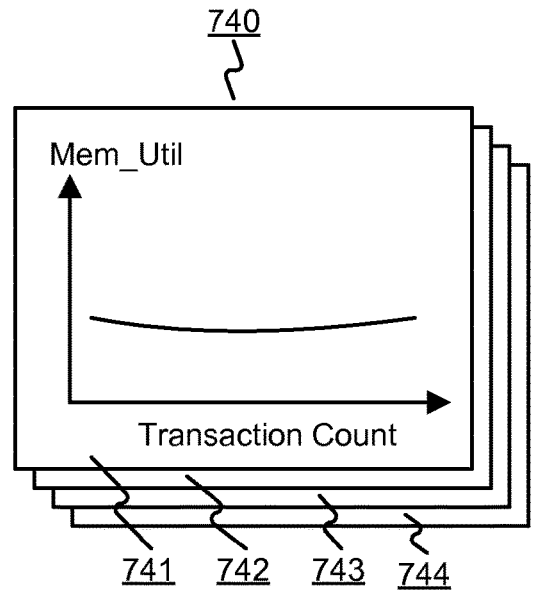
740
721 722 723 724
741 742 743 744
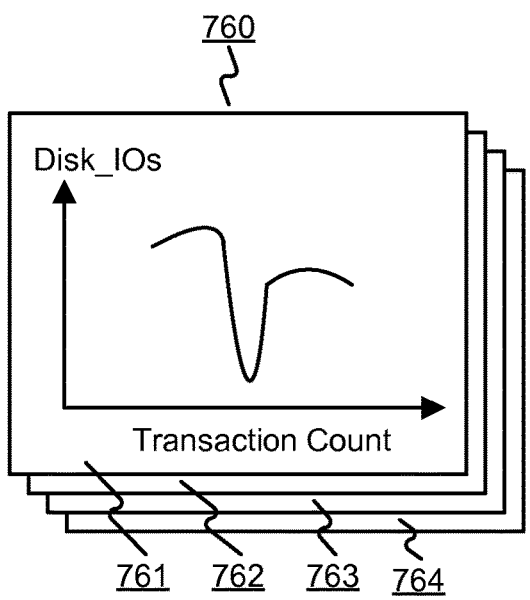
760
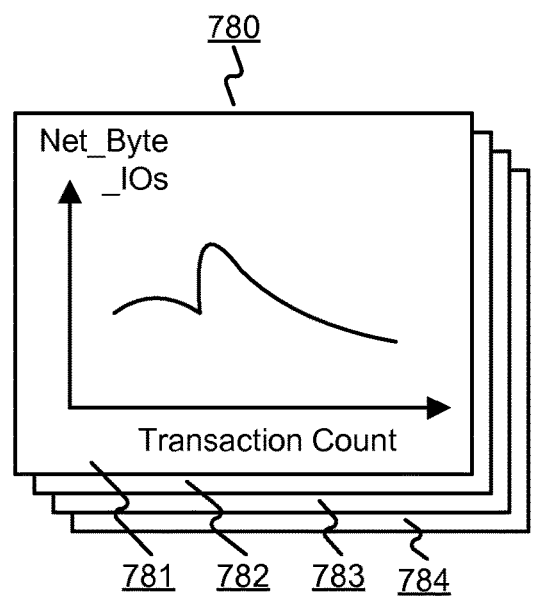
780
761 762 763 764
781 782 783 784
FIG. 7

| | Device_name_1 | Device_name_2 | Device_name_3 | Device_name_4 |
|---|---|---|---|---|
| 910 Device | | | | |
| 911 Mode | passive | | active-active | |
| 912 Operating System | linux | | | |
| 913 Memory Util. % (6 month upper control limit) | 69.89% | 65.55% | 60.78% | 56.05% |
| Last week | 67.17% | 65.67% | 53.43% | 51.00% |
| 914 CPU Util. % (6 month upper control limit) | 45.96% | 46.16% | 86.11% | 80.18% |
| Last week | 66.00% | 67.17% | 83.33% | 80.17% |
| 915 Disk I/O (6 month upper control limit) | | | 1514.46 | 405.80 |
| Last week | | | 418.81 | 370.59 |
| 916 LOB / Channel | Digital | | | |
| 917 Subgroup Name | Mobile Banking | | | |
| 918 Category | Virtual | | | |
| 919 Environment | Production | | | |
| 920 CI_NUM_OF_CPUS | 4 | 4 | 4 | 4 |
| 921 CI_PROCESSOR_SPEED | 2400 | 2400 | 2400 MHz | 2400 MHz |
| 922 CI_PHYSICAL_MEMORY_KB | 16050 | 15922 | 16050000 | 16050000 |
| 923 LOC_TXT | CENTER 54 | CENTER 02 | DATA CENTER 1 | DATA CENTER 3 |
| 924 # Days with CPU anomalies (SEDS) | 5 | 3 | | |

SYSTEMS AND METHODS FOR MODELING COMPUTER RESOURCE MEIRICS

RELATED APPLICATIONS

This application is a continuation of U.S. patent application Ser. No. 15/184,501, filed Jun. 16, 2016, which claims priority under 35 U.S.C. § 119 to U.S. Provisional Patent Application No. 62/180,777, filed on Jun. 17, 2015. The disclosures of the above-identified applications are expressly incorporated herein by reference in their entireties.

TECHNICAL FIELD

This disclosure relates generally to system modeling, and more particularly to systems and methods for modeling computer resource metrics.

BACKGROUND

Companies use Information Technology (IT) infrastructure to execute various aspects of their businesses. Different automated services (e.g., online banking, mobile banking, ATM operations, or mobile check cashing) experience different patterns of business demand from customers. The demand fluctuations can, for example, be on an hourly, daily, weekly, monthly, quarterly, annually, or seasonal basis. Nevertheless, customers expect that the Information Technology (IT) infrastructure will be able to provide expeditious service on demand at all times. Traditionally, in industries with a complex supply chain, businesses have to rely upon partners in the lines of business to provide details around business demand. The data provided, however, tends to come in different time intervals, many times with missing or inconsistent data.

In addition to lacking consistent and accurate business demand data sources, knowing which infrastructure components support which business services may be challenging. Also, studying the demands on IT infrastructure posed by each business service may be challenging and time consuming. Further, refreshing and validating models studying IT demands may be challenging given the lack of a baseline for comparison due to rapidly changing demand and business conditions.

Currently, time-series charts are used to predict when servers and databases may run out of capacity, and to resolve issues. Time-series trending, however, comes without sufficient context. For example, upon identifying that a server's utilization increased from 40 to 50% without any other context suggests that there could be a problem, whereas an accompanying context that a marketing campaign caused a temporary spike in demand for a service facilitated by that server would indicate otherwise. Currently, business-driven capacity models are developed on a case-by-case basis, manually. The development of automated models is limited, however, by technological and computational constraints in performing the modeling.

SUMMARY

In one embodiment, a processor-implemented computer resource metric modeling method is disclosed. According to the method, business transaction data related to one or more business transaction types may be aggregated. One or more statistical trends may be detected in the business transaction data for each business transaction type. For each business transaction type, one or more devices facilitating the business transaction type may be mapped, and device utilization data for the one or more devices may be aggregated. Further, one or more statistical trends may be detected in the device utilization data. Also, one or more linear regression models of a relationship between device utilization and business transaction volume may be generated. The method may continue by calculating one or more diagnostic statistics for the one or more linear regression models, and filtering out a subset of the linear regression models based on the one or more diagnostic statistics. One or more forecasts may be generated using the remaining linear regression models. Also, a report may be generated and provided based on the one or more forecasts.

In another embodiment, a system is disclosed comprising one or more hardware processors, and one or more memory units storing instructions executable by the one or hardware processors to perform acts comprising a computer resource metric modeling method. According to the method, business transaction data related to one or more business transaction types may be aggregated. One or more statistical trends may be detected in the business transaction data for each business transaction type. For each business transaction type, one or more devices facilitating the business transaction type may be mapped, and device utilization data for the one or more devices may be aggregated. Further, one or more statistical trends may be detected in the device utilization data. Also, one or more linear regression models of a relationship between device utilization and business transaction volume may be generated. The method may continue by calculating one or more diagnostic statistics for the one or more linear regression models, and filtering out a subset of the linear regression models based on the one or more diagnostic statistics. One or more forecasts may be generated using the remaining linear regression models. Also, a report may be generated and provided based on the one or more forecasts.

In yet another embodiment, a non-transitory computer-readable medium is disclosed, storing instructions executable by one or more hardware processors to perform acts comprising a computer resource metric modeling method. According to the method, business transaction data related to one or more business transaction types may be aggregated. One or more statistical trends may be detected in the business transaction data for each business transaction type. For each business transaction type, one or more devices facilitating the business transaction type may be mapped, and device utilization data for the one or more devices may be aggregated. Further, one or more statistical trends may be detected in the device utilization data. Also, one or more linear regression models of a relationship between device utilization and business transaction volume may be generated. The method may continue by calculating one or more diagnostic statistics for the one or more linear regression models, and filtering out a subset of the linear regression models based on the one or more diagnostic statistics. One or more forecasts may be generated using the remaining linear regression models. Also, a report may be generated and provided based on the one or more forecasts.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 4A-B are block diagrams illustrating transaction data aggregated according to some embodiments.

FIG. 5 is a block diagram illustrating a device-transaction map according to some embodiments.

FIGS. 6A-D are block diagrams illustrating computer resource utilization metrics according to some embodiments.

FIG. 7 illustrates graphs correlating transaction volume to computer resource utilization metrics according to some embodiments.

FIGS. 9A-C are graphic diagrams illustrating statistical exception and trend detection reports according to some embodiments.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Disclosed embodiments solve the problems listed above that were recognized by the inventors of the present subject matter, as well as other problems. In some embodiments, an enterprise source, such as an IT data warehouse, may be used to aggregate demand metrics in a business transactions database, which may provide large-scale access to a consistent data source. The warehouse may be updated periodically, e.g., monthly. Further, a configuration management database may provide an enterprise system of record to accurately identify which servers and databases facilitate which IT services.

A periodic/dynamic automated process may create new models attempting to correlate variations in services demand to utilization metrics for the components of the IT infrastructure. Further, models providing the best fit in correlating the aggregated demand metrics to IT component utilization metrics may be retained for demand and IT component utilization forecasting, while other models may be eliminated. Such a process may be performed constantly, e.g., periodically, so that the best models are constantly updated before being used in the forecasting process. By incorporating business demand modeling into the IT infrastructure sizing efforts, among other benefits, future business plans may be incorporated into forecasts for computational load balancing, infrastructure purchasing, and infrastructure build-out processes, and opportunities for business partners to run additional marketing campaigns (to utilize available IT infrastructure) may be identified that can generate more revenue for the same or only marginally increased IT infrastructure costs.

Figure 1:
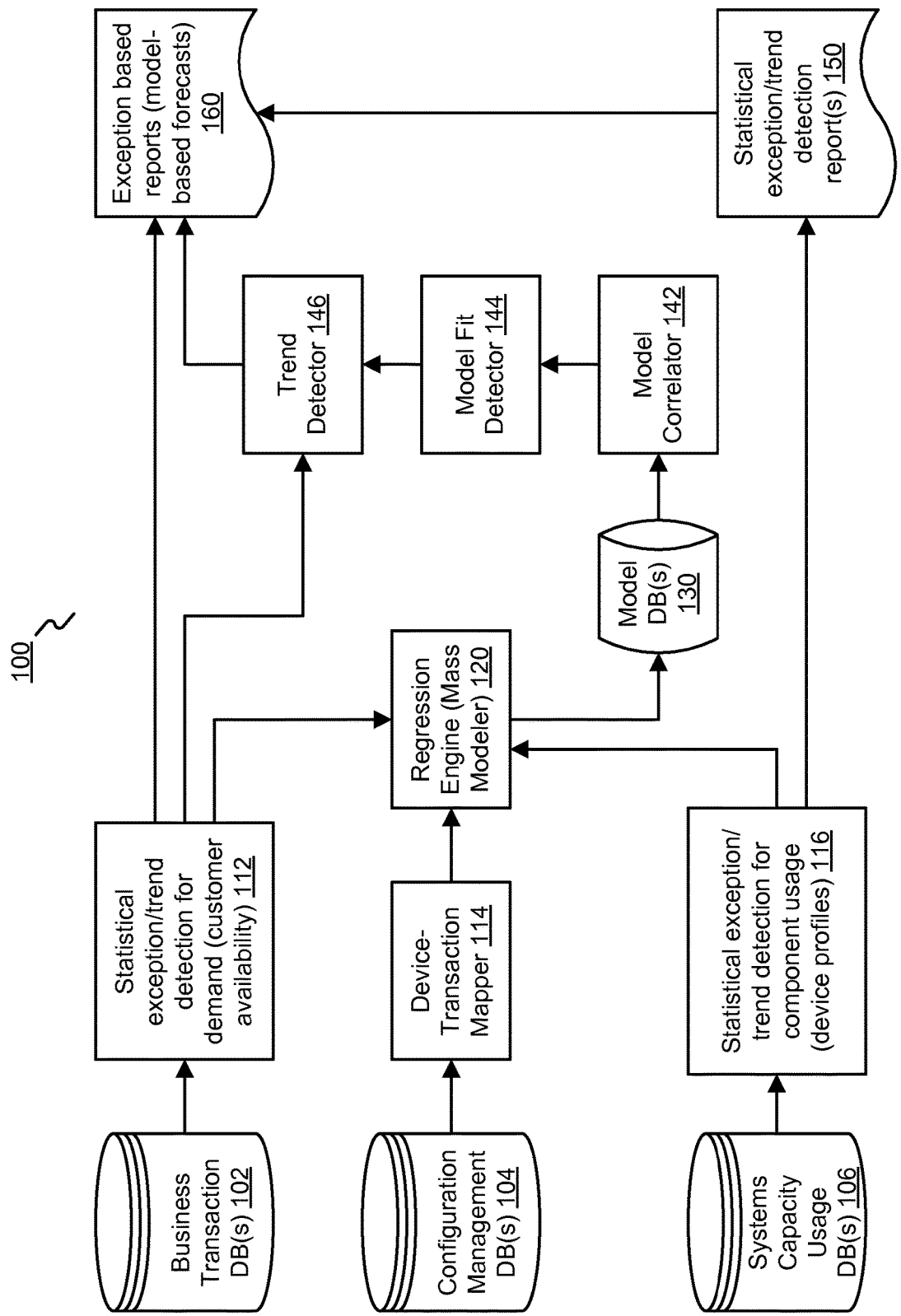
FIG. 1 is a functional block diagram of a computer resource metrics modeling system according to some embodiments.

FIG. 1 is a functional block diagram of a computer resource metrics modeling system 100 according to some embodiments. In some embodiments, system 100 may comprise a transaction database 102, which may store data on various transactions (also referred to herein more generally as "interactions") facilitated by the IT infrastructure. A systems capacity usage database 106 may store information about the processing or computation ability of the devices that form part of the IT infrastructure, as well as data on their performance metrics (e.g., CPU usage, memory usage, network I/O usage, and disk I/O usage, among others). In some embodiments, two modules, 112 and 116, may perform statistical analysis on the data stored in the business transaction database 102 and the system capacity usage database 106.

In some embodiments, the details of the configuration of the IT infrastructure may be stored in a configuration management database 104. For example, the configuration management database may store a log of transactions performed, and the names or other identifying information for the computer(s) or other devices that facilitated the transactions. A device-transaction mapper 114 may take such a log, and extract a mapping of transaction type to the device(s) that facilitate that transaction type.

Using the transaction type-device map, as well as the statistical analysis from modules 112 and 116, a model generator module, e.g., 120, may generate models that map the variations of the demand for a particular type of transaction against the performance metrics of the IT infrastructure devices. Such models may be stored in a model database 130. A model correlation module 142, model fit detector 144, and trend detector 146 may be used to evaluate the models stored in the database, and select the models that may be used for forecasting or evaluating the current performance of the IT infrastructure. Further, system 100 may include modules 150 and 160 to generate reports and graphics as part of reports output by system 100.

Figure 2:
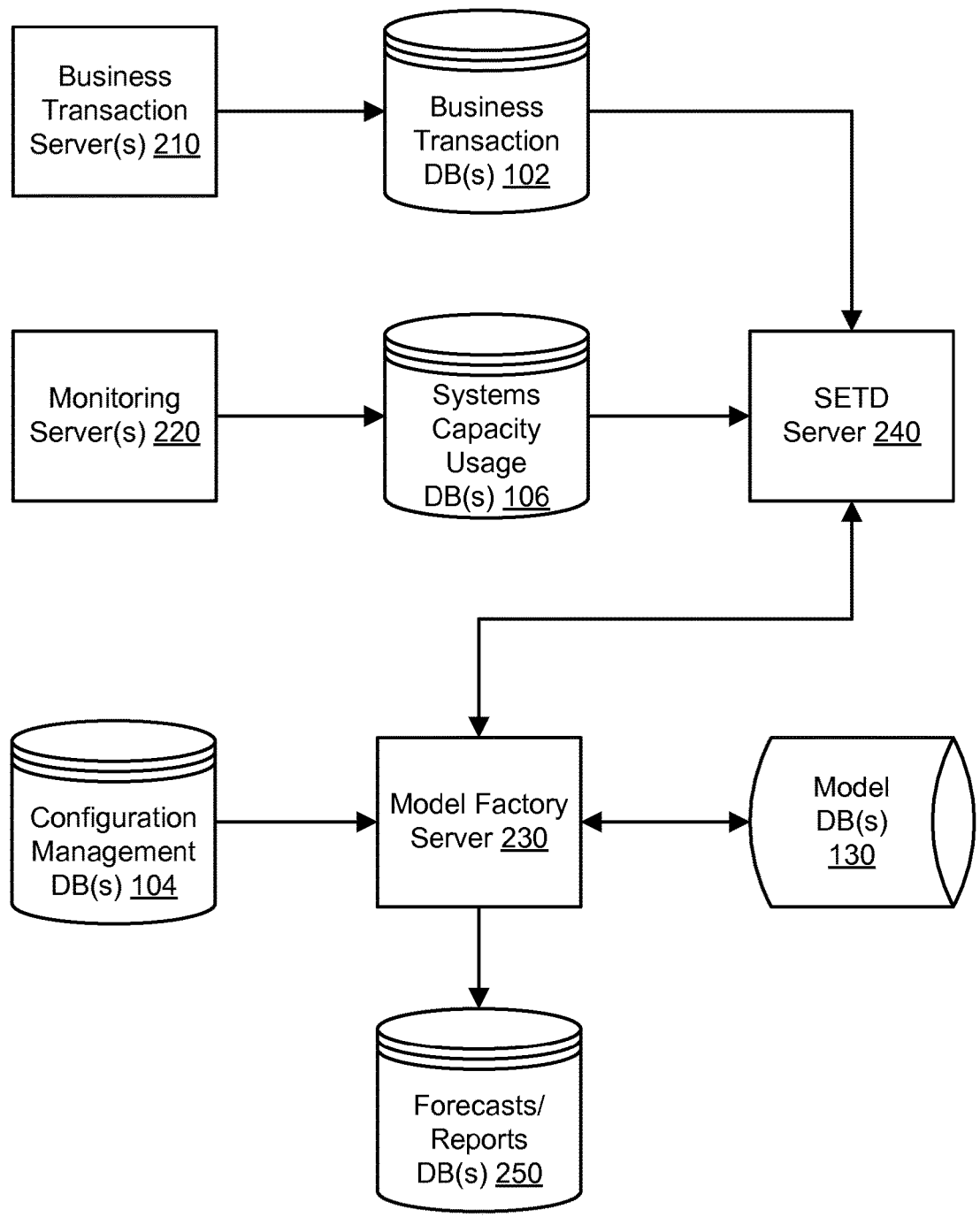
FIG. 2 illustrates an exemplary system according to some embodiments.

FIG. 2 illustrates an exemplary system 200 according to some embodiments. A business transaction server 210 may conduct transactions in response to customer demands, and provide a log of transactions to the business transaction database 102. A monitoring server 220 may obtain diagnostic information on the operation of the transaction server 210 (e.g., CPU usage, memory usage, Network usage, Disk usage, etc.) and provide the diagnostic information for storage in a systems capacity usage database 106. A statistical exception/trend detection (SETD) server 240 may perform statistical analysis, as described further below, and provide the statistical analysis to a model factory server 230 based on requests form the model factory server 230. A configuration management database 104 may store data on which transaction types are facilitated by which computers within the business transaction server 210. Using this information, model factory server may generate models stored in model database 130, and generate forecasts or reports for storage in forecasts/reports database 250. The components and arrangement of the components included in system 100 may vary, and the depicted arrangement is only exemplary.

The database in system 100 may be implemented as fault-tolerant, relational, scalable, secure databases such as Oracle or Sybase. Alternatively, such databases may be implemented using standardized data structures, such as an array, hash, linked list, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The computing systems in system 100 may be implemented in the form of a server, general-purpose computer, a mainframe computer, laptop, smartphone, mobile device, or any combination of these components. In certain embodiments, the computing system may be configured as a particular apparatus, system, and the like based on the storage, execution, and/or implementation of the software instructions that perform one or more operations consistent with the disclosed embodiments. Computing system may be standalone, or it may be part of a subsystem, which may be part of a larger system. The computer may include one or more processors, memory storing programs, and peripheral I/O devices.

The processors may include one or more known processing devices, such as a microprocessor from the Pentium™ or Xeon™ family manufactured by Intel™, the Turion™ family manufactured by AMD™, or any of various processors manufactured by Sun Microsystems. The processor may constitute a single core or multiple core processor that executes parallel processes simultaneously. For example, a processor may be a single core processor configured with virtual processing technologies. In certain embodiments, a processor may use logical processors to simultaneously execute and control multiple processes. A processor may implement virtual machine technologies, or other known technologies to provide the ability to execute, control, run, manipulate, store, etc. multiple software processes, applications, programs, etc. In another embodiment, A processor may include a multiple-core processor arrangement (e.g., dual, quad core, etc.) configured to provide parallel processing functionalities to allow the computing system to execute multiple processes simultaneously. One of ordinary skill in the art would understand that other types of processor arrangements could be implemented that provide for the capabilities disclosed herein. The disclosed embodiments are not limited to any type of processor(s).

Memory may include one or more storage devices configured to store instructions used by a processor to perform functions related to the disclosed embodiments. For example, memory may be configured with one or more software instructions, such as program(s) that may perform one or more operations when executed by a processor. The disclosed embodiments are not limited to separate programs or computers configured to perform dedicated tasks. For example, memory may include a program that performs the functions of any of the functional blocks of system 200. Additionally, a processor may execute one or more programs located remotely from computing system 200. Memory may be a volatile or non-volatile, magnetic, semiconductor, tape, optical, removable, non-removable, or other type of storage device or tangible (e.g., non-transitory) computer-readable medium.

I/O devices may be one or more devices configured to allow data to be received and/or transmitted by a computing system. I/O devices may include one or more digital and/or analog communication devices that allow a computing system to communicate with other machines and devices, such as other components of system 200. For example, a computing system may include interface components, which may provide interfaces to one or more input devices, such as one or more keyboards, mouse devices, and the like, which may enable the computing system to receive input from an operator of user device.

Figure 3A:
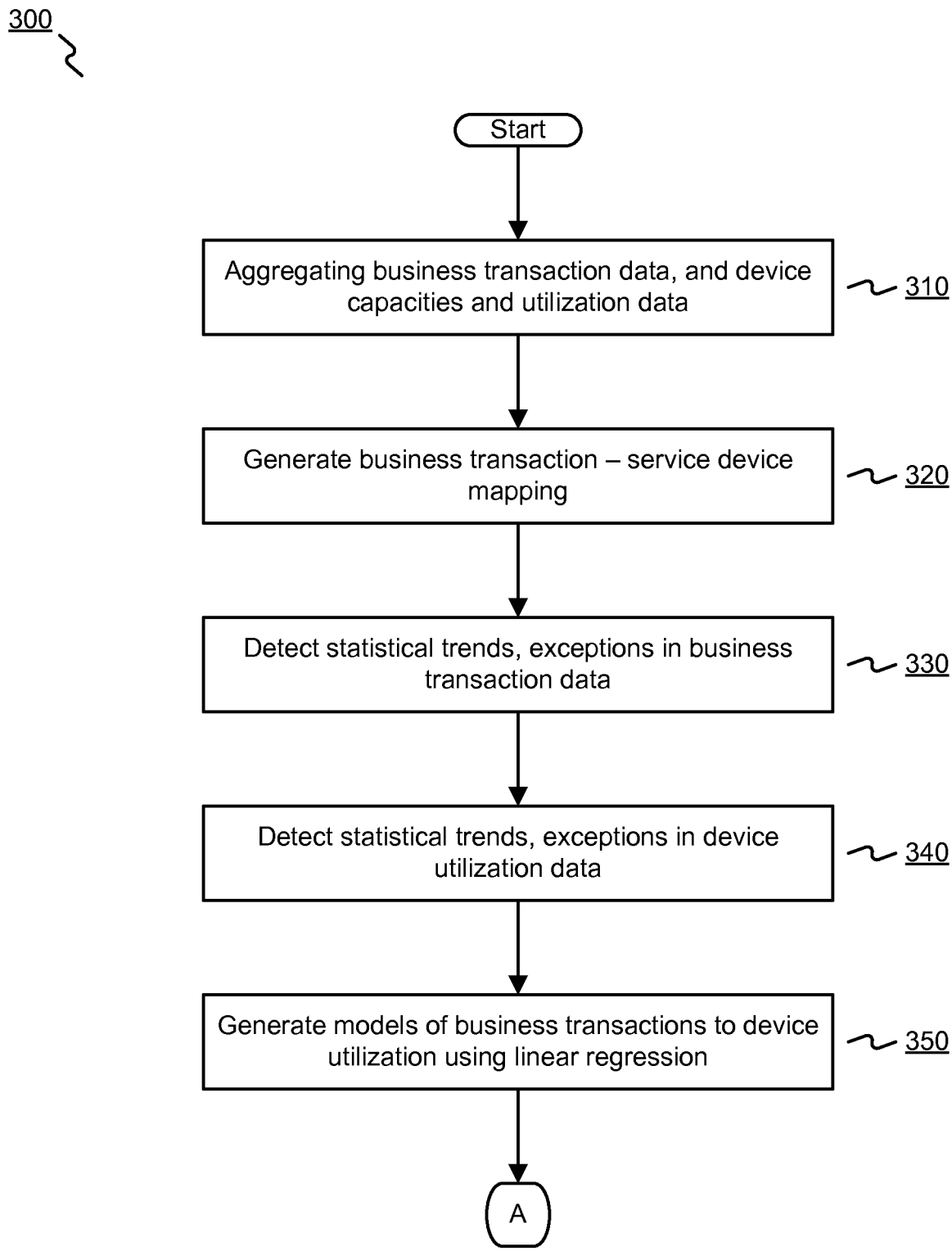
FIGS. 3A-B are flow diagrams illustrating a method for computer resource metric modeling in accordance with some embodiments.
Figure 3B:
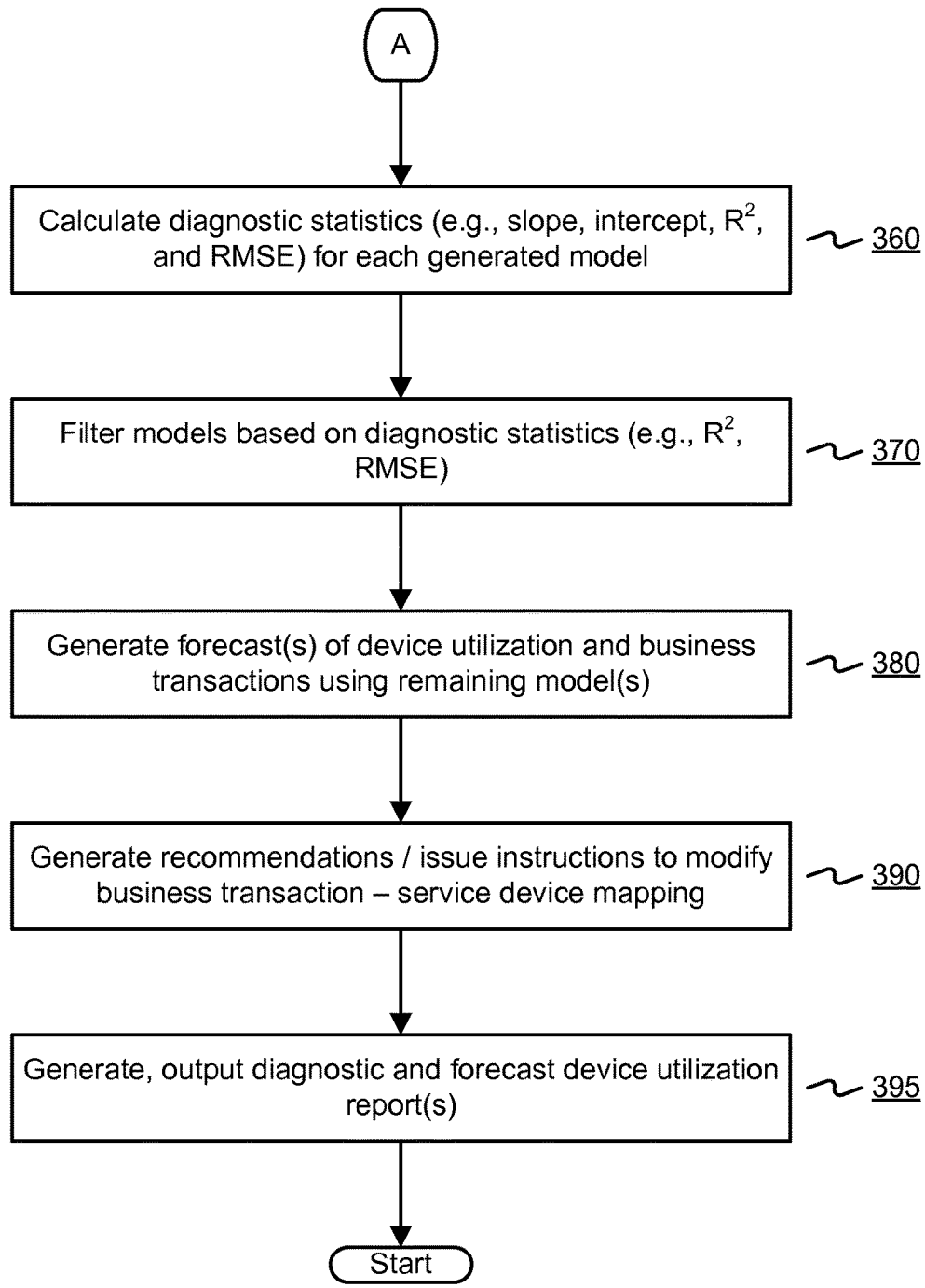

FIGS. 3A-B are flow diagrams illustrating an exemplary method for computer resource metric modeling in accordance with some embodiments. With reference to FIG. 3A, in some embodiments, at step 310, a business transaction server 210 may aggregate business transaction data. Business transaction server 210 may store the aggregated business transaction data in business transaction database 102.

FIGS. 4A-B are block diagrams illustrating transaction data aggregated according to some embodiments. With reference to FIG. 4A, in some embodiments, a bank ATM transaction database table 400 may store transaction volumes for various types of transactions conducted or experienced by an organization (e.g., a financial services firm, a bank, a credit card processing company, etc.). Bank ATM transaction database table 400 may include various fields. For example, a field in bank ATM transaction database table 400 could be a transaction type 405, e.g., ATM banking, mobile login, mobile check deposit, bank account web access, etc. Another field in bank ATM transaction database table 400 may be a timestamp, which may comprise a date 410 and an hour indicator 415. More coarse or refined timestamps may be used. Another field in bank ATM transaction database table 400 may be a transaction count 420, which may represent a volume of transactions occurring in a time span related to the timestamp, e.g., 1 hour. In some cases, the transaction volume may be resolved at the timescale of the smallest amount of time that can be represented by the timestamp (e.g., 1 hour in the example illustrated in the figure). Another field in bank ATM transaction database table 400 may be a data source 425 for the data aggregated into transaction database table 400. Bank ATM transaction database table 400 may include one or more records (e.g., rows in transaction database table 400) including data in one or more of the fields represented in bank ATM transaction database table 400. For example, bank ATM transaction database table 400 may include one row for each minimum representable time span (e.g., 1 hour) within a particular time period (e.g., 1 day, 1 work week, 1 week including weekends, 1 month, 1 quarter, 1 year, 1 season, etc.)

With reference to FIG. 4B, in some embodiments, a mobile login transaction database table 450 may include similar fields as bank ATM transaction database table 400, such as transaction type 455, a timestamp, which may comprise a date 460 and an hour indicator 465, transaction count 470, and data source 475. Mobile login transaction database table 450 may include one or more records (e.g., rows in mobile login transaction database table 450) including data in one or more of the fields represented in mobile login transaction database table 450. In some embodiments, tables such as bank ATM transaction database table 400 and mobile login transaction database table 450 may be implemented as a single consolidate master table of transaction data. Any other transaction types may be represented in such database tables, including, for example, the transaction types 510 listed in FIG. 5.

Returning to step 310 of FIG. 3A, in some embodiments, monitoring server 220 may aggregate device (e.g., computer server) capacities and utilization data (e.g., computer resource utilization metrics). Monitoring server 220 may store the aggregated device capacities and utilization data in systems capacity usage database 106.

FIGS. 6A-D are block diagrams illustrating computer resource utilization metrics according to some embodiments. With reference to FIG. 6A, in some embodiments, a CPU resource utilization table 600 for a particular device (e.g., a back-end server, or a business transaction server 210) may include various fields. For example, a field in CPU resource utilization table 600 could be a date/time stamp 602, providing a time reference for the remaining data in CPU resource utilization table 600.

Another field in CPU resource utilization table 600 could be a CPU load 604, e.g., representing an average load experienced by the device's CPU during a time window centered around the timestamp 602 value. Another field in CPU resource utilization table 600 could be a CPU maximum load 606, e.g., representing a peak load experienced by the device's CPU during a time window centered around the timestamp 602 value. Another field in CPU resource utilization table 600 could be a CPU utilization factor 608, e.g., representing an average percentage of utilization of the device's CPU during a time window centered around the timestamp 602 value. Another field in CPU resource utilization table 600 could be a CPU maximum utilization factor 610, e.g., representing a peak percentage of utilization of the device's CPU during a time window centered around the timestamp 602 value. Another field in CPU resource utilization table 600 could be a CPU minimum utilization factor 612, e.g., representing a trough percentage of utilization of the device's CPU during a time window centered around the timestamp 602 value.

CPU resource utilization table 600 may include one or more records (e.g., rows in CPU resource utilization table 600) including data in one or more of the fields represented in CPU resource utilization table 600. For example, CPU resource utilization table 600 may include one row for each minimum time span representable by date/time stamp 602 (e.g., 1 hour) within a particular time period (e.g., 1 day, 1 work week, 1 week including weekends, 1 month, 1 quarter, 1 year, 1 season, etc.).

With reference to FIG. 6B, in some embodiments, a Disk resource utilization table 625 for a particular device may include disk resource utilization fields in the same or similar way that CPU resource utilization table 600 includes CPU resource utilization fields. Disk resource utilization table 625 may include a date/time stamp 622, providing a time reference for the remaining data in Disk resource utilization table 625. Others field that Disk resource utilization table 625 could include may be Disk IOs 624 (e.g., number of disk I/O operations), Disk queue 626 (e.g., average number of pending disk I/O requests) Disk maximum queue 628 (e.g., peak number of pending disk I/O requests), Disk busy percentage 630 (e.g., average of a percentage device disk busy indicator), and Disk busy maximum percentage 632 (e.g., peak of a percentage device disk busy indicator). These fields may all provide metrics about the device's disk operations during a time window centered around the timestamp 622 value. The time window can be a minimum time span representable by date/time stamp 682 (e.g., 1 hour).

Disk resource utilization table 625 may include one or more records (e.g., rows in Disk resource utilization table 625) including data in one or more of the fields represented in Disk resource utilization table 625. For example, Disk resource utilization table 625 may include one row for each minimum time span representable by date/time stamp 622 (e.g., 1 hour) within a particular time period (e.g., 1 day, 1 work week, 1 week including weekends, 1 month, 1 quarter, 1 year, 1 season, etc.).

With reference to FIG. 6C, in some embodiments, a Memory resource utilization table 650 for a particular device may include memory resource utilization fields in the same way that CPU resource utilization table 600 includes CPU resource utilization fields. Memory resource utilization table 650 may include a date/time stamp 652, providing a time reference for the remaining data in Memory resource utilization table 650. Others field that Memory resource utilization table 650 could include may be memory paged 654 (e.g., average amount of memory paged), maximum memory paged 656 (e.g., peak amount of memory paged), memory used 658 (e.g., average amount of memory in use), and maximum memory used 660 (e.g., peak amount of memory in use). These fields may all provide metrics about the device's memory operations during a time window centered around the timestamp 652 value. The time window can be a minimum time span representable by date/time stamp 682 (e.g., 1 hour).

Memory resource utilization table 650 may include one or more records (e.g., rows in Memory resource utilization table 650) including data in one or more of the fields represented in Memory resource utilization table 650. For example, Memory resource utilization table 650 may include one row for each minimum time span representable by date/time stamp 652 (e.g., 1 hour) within a particular time period (e.g., 1 day, 1 work week, 1 week including weekends, 1 month, 1 quarter, 1 year, 1 season, etc.).

With reference to FIG. 6D, in some embodiments, a Network resource utilization table 675 for a particular device may include network resource utilization fields in the same way that CPU resource utilization table 600 includes CPU resource utilization fields. Network resource utilization table 675 may include a date/time stamp 682, providing a time reference for the remaining data in Network resource utilization table 675. Others field that Network resource utilization table 675 could include may be network byte IOs 684 (e.g., average number of bytes input and/or output), network queue 686 (e.g., an average number of pending network requests), and maximum network queue 688 (e.g., peak number of pending network requests). These fields may all provide metrics about the device's network operations during a time window centered around the timestamp 682 value. The time window can be a minimum time span representable by date/time stamp 682 (e.g., 1 hour).

Network resource utilization table 675 may include one or more records (e.g., rows in Network resource utilization table 675) including data in one or more of the fields represented in Network resource utilization table 675. For example, Network resource utilization table 675 may include one row for each minimum time span representable by date/time stamp 682 (e.g., 1 hour) within a particular time period (e.g., 1 day, 1 work week, 1 week including weekends, 1 month, 1 quarter, 1 year, 1 season, etc.).

In some embodiments, the above-described computer resource utilization metric tables of FIG. 6A-D may be implemented as a single consolidate master table, and also in conjunction with other tables described in this disclosure. Any other computer resource utilization metrics may also be represented in such database tables.

Returning to step 310 of FIG. 3A, business transaction database 102 and systems capacity usage database 106 may provide large-scale access to a consistent data source. For example, these databases may be implemented using relational database management systems (RDBMS). The databases may be updated periodically, e.g., monthly, to as to provide up-to-date data for model generation and forecasting purposes.

At step 320, model factory server 230 may generate a mapping of transaction types to one or more service devices facilitating those transaction types, using data obtained from configuration management database 104. Configuration management database 104 may provide an enterprise system of record to accurately identify which servers and databases facilitate which IT services. FIG. 5 is a block diagram illustrating a device-transaction map 500 according to some embodiments. Device-transaction map 500 may include a transaction type 510 field and a device name 520 field. Each transaction type (e.g., logging into a bank account online (BANK-IP-LOG 540), mobile check deposit (C1360-MOB-CHECK 550), etc.) may be assigned one (see, e.g., BANK-IP-LOG 540) or more (see, e.g., C1360-MOB-CHECK 550) device names 520 that facilitate the transaction type. Device-transaction map 500 may also include additional fields of useful information, such as Operating System 530 running on the identified device.

Returning to FIG. 3A, in some embodiments, SETD server 240 may obtain the aggregated transaction data, and the aggregated service capacities and utilization data from business transaction database 102 and systems capacity usage database 106, respectively (step not shown). SETD server 240 may further, at step 330 and step 340, detect statistical trends in the aggregated transaction data and in the aggregated utilization data, using linear regression or other statistical techniques. Examples of such techniques are provided in:

1. Jeffrey Buzen and Annie Shum: "MASF—Multivariate Adaptive Statistical Filtering," Proceedings of the Computer Measurement Group, pp. 1-10, (January 1995).
2. Kevin McLaughlin and Igor Trubin, "Exception Detection System, Based on the Statistical Process Control Concept", Proceedings of the Computer Measurement Group (2001).
3. Igor Trubin, "Exception Based Modeling and Forecasting," Proceedings of the Computer Measurement Group, pp. 1-11 (January 2008).
4. Igor Trubin, "System Management by Exception: SETDS Methodology," http://itrubin.blogspot.com/2012/11/setds-methodology-cmg12-speech.html (Nov. 20, 2012).

These references are hereby incorporated into the disclosure in their entirety for all purposes. For example, SETD server 240 may use pre-processed and smoothed data in the form of multivariate adaptive statistical filtering (MASF) weekly 168 hour profiles. These "profiles" may view each hour in a seven day week as a single data point. On the x axis may lie hours 1 through 168. Each data point may be an average of that hour's y-axis (either system resource utilization or transaction count) for the past six months. A single data point may be an average of 26 data points for that hour of that day of the week for the past six months.

In another embodiment, SETD server 240 may generate a weekly profile for every device for which data is collected. It may average hourly observations across six months (for example: every Monday in the last six months from 14:00-15:00 may be averaged into one data point) and create a weekly profile view of server utilization. It may generate an average, an upper control limit, a lower control limit, and show the past seven days' hourly utilization plotted against the baseline, e.g., the moving average of that particular hour of that particular day of week. SETD server 240 may do this for transaction counts for a particular transaction type, CPU, Memory, and disk input/output (I/O) metrics, as well as any other computer resource utilization metric(s) available to SETD server 240. Thus, SETD server 240 may detect variations from the norm, indicating that an analyst should investigate if there are abnormal behaviors pointing to a potential capacity concern. SETD server 240's analysis may also indicate how a server should behave under normal circumstances at a given time. SETD server 240 may smooth out the noise and thus show typical behavior.

At step 350, SETD server 240 may generate models of the relationship of business transactions to device utilization using such analysis techniques as described above. Use of such analysis techniques may be able to reduce processing time to produce, e.g., 150,000 models on a monthly basis. The models generated may show the relationship between consumer demand for a transaction type and server profiles for each metric monitored, e.g., CPU utilization, Memory Utilization, Disk I/O, and Network I/O. In one example, a model may be generated for each shift (168 hour full week, a week excluding weekends, a week excluding Sunday 00:00-06:00). A model may be generated for the six-month baseline and for the last week of observations as well. In an example with three metrics (CPU, Memory, Disk I/O), three shifts (168 hour full week, week excluding weekends, week excluding Sunday 00:00-06:00), and two profiles (six-month baseline, and the last week of observations), 18 models would be generated per transaction type—device combination.

FIG. 7 illustrates graphs correlating transaction volume to computer resource utilization metrics according to some embodiments. In the example of FIG. 7, CPU (720), Memory (740), Disk I/O (760), and Network I/O (780) utilization may be correlated to counts of the C1360-MOB-CHECK mobile check deposit transaction, facilitated by a device "tpmonitor" 550. Further models may be generated on a weekly (see 721, 741, 761, and 781), monthly (see 722, 742, 762, and 782), quarterly (see 723, 743, 763, and 783), and/or yearly (see 724, 744, 764, and 784) basis for this transaction type-device combination.

Figure 8:
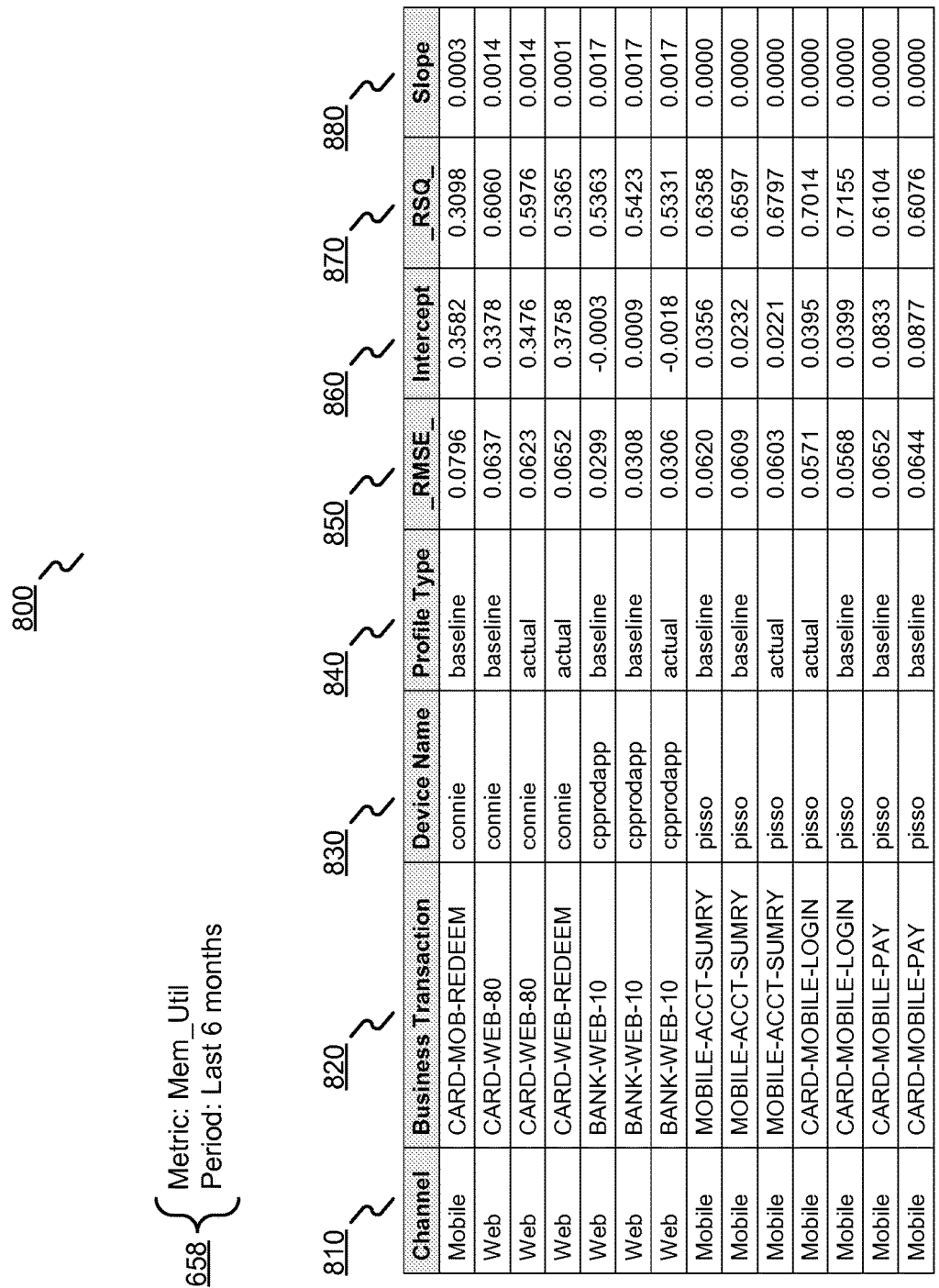
FIG. 8 is a block diagram illustrating model diagnostic statistics according to some embodiments.

With reference to FIG. 3B, in some embodiments, at step 360, SETD server 240 may calculate diagnostic statistics (e.g., slope, intercept, $R^2$ fit value, and root-mean-squared-error (RMSE)) for each generated model, using the techniques described previously with reference to steps 340 and 350. FIG. 8 is a block diagram illustrating model diagnostic statistics according to some embodiments. Specifically, FIG. 8 shows, for various combinations of business transactions 820 (operating via commerce channels 810) and device names 830, for either deviations from a baseline over a six-month period or for actual values over a period over the last 6 months (see 658), the correlation of memory utilization to transaction counts. In particular, FIG. 8 shows the slope, intercept, $R^2$ value, and RMSE value for this particular set of models.

Returning to FIG. 3B, in some embodiments, at step 370, model factory server 230 may filter out a subset of the generated models based on the generated diagnostic statistics. For example, if the $R^2$ value is low, then there is a low correlation between the fluctuations in memory utilization and those of the transaction counts in the tested model, which therefore would not serve as a good model to forecast future behavior, or understand current behavior of the device facilitating the transaction type.

At step 380, model factory server 230 may generate forecasts of device utilization and business transactions using the models remaining after the model filtration at step 370. For example, model factory server 230 may calculate an estimated business demand threshold for each model and score the models. An algorithm to score models based on strength of the relationship and current consumption and utilization rates may allow focus on the areas that are most constrained or are the best indicators or bottlenecks in the system.

At step 390, model factory server 230 may generate recommendations, and/or issue instructions to modify the transaction type—device mapping, e.g., for the purpose of computation load balancing, or better matching a device that has a high capacity in one metric (like memory) with the transaction types that tend to require a high capacity for that metric. At step 395, model factory server 230 may generate output diagnostic, transaction forecast, and device utilization forecast reports based on the modeling procedure described above.

Figure 9B:
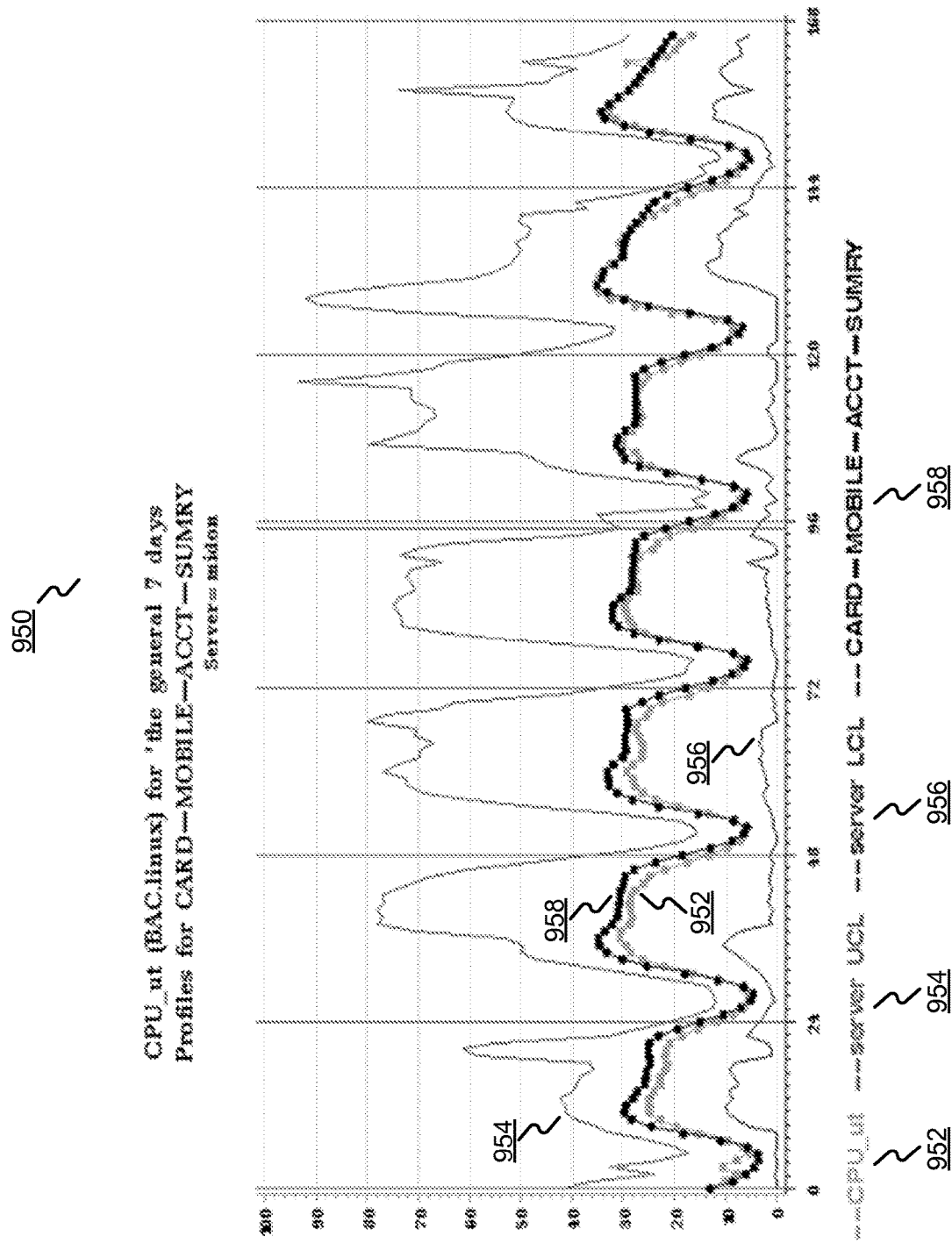
Figure 9C:
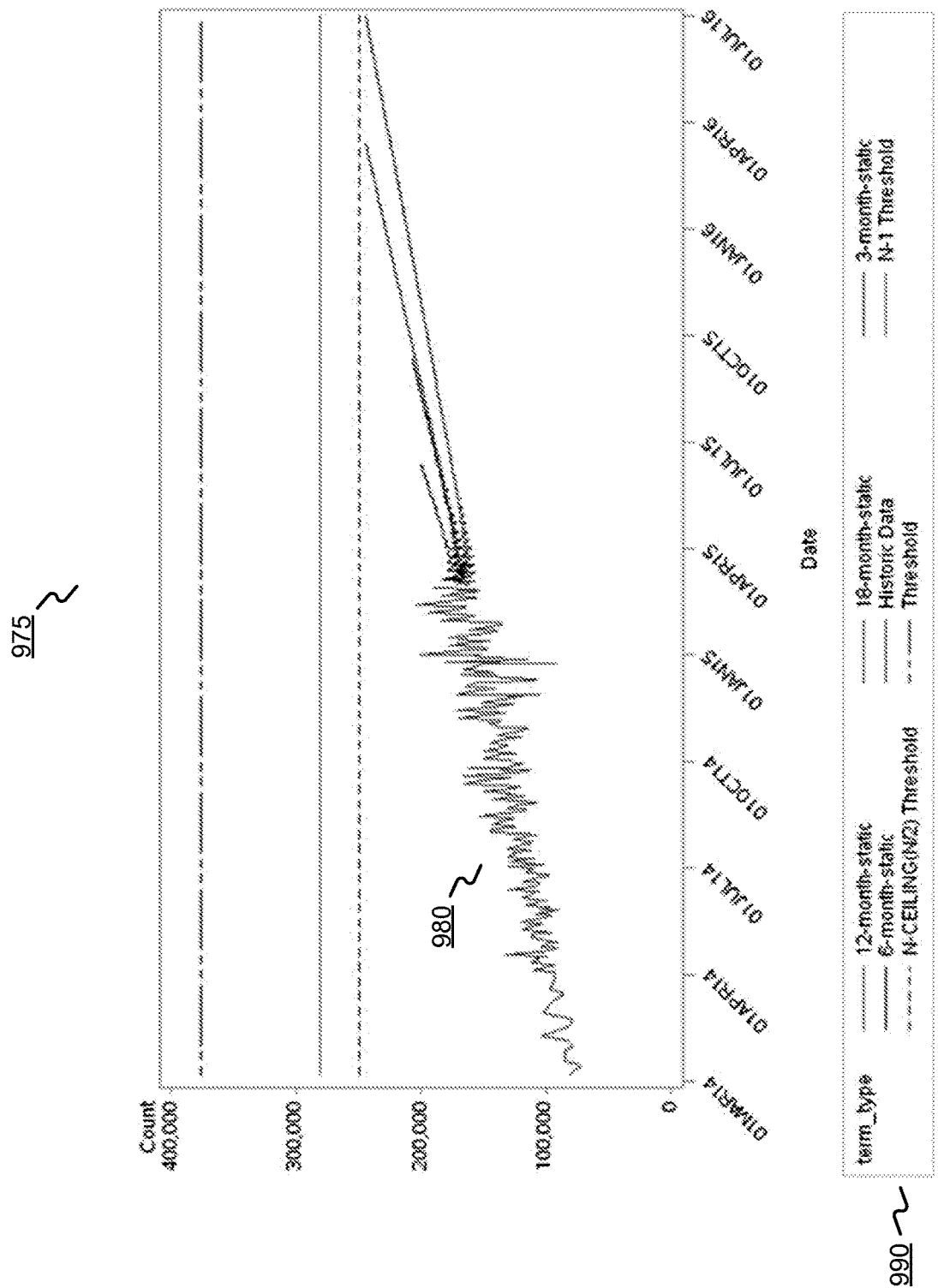

FIGS. 9A-C are graphic diagrams illustrating statistical exception and trend detection reports according to some embodiments. FIG. 9A shows a report 900 for a particular set of devices (910), providing diagnostics along a range of parameters (see 911-924). FIG. 9B shows a graph 950 showing the CPU utilization of a group of devices facilitating a CARD-MOBILE-ACCT-SUMRY transaction type over a 180-day period showing the CPU utilization of a group of devices facilitating a CARD-MOBILE-ACCT-SUMRY transaction type over a 168-hour SEDS generated control chart period. It shows, in particular, the average CPU utilization, upper cut-off, lower cut-off of CPU utilization, as well as the volume of the CARD-MOBILE-ACCT-SUMRY transaction. From the figure, it can be seen that there is a strong correlation between this transaction type and CPU utilization. Thus, forecasting of transaction volume and CPU utilization can be done well with this particular model. FIG. 9C shows a forecast generated using one of the models from the model factory server 230, providing a variety of forecasting data points.

Additional embodiments may reduce the number of models being generated. A grouping mechanism may be utilized to identify servers that are working in tandem. The existence of redundant servers or multiple nodes can be detected via naming convention and by comparing profiles. This can reduce the number of models being generated significantly. For example, if there are four servers working in a group, only one model may be needed for the group, rather than one model for each server. A load balancing server may ensure that the servers handle traffic in a similar fashion. Demand metrics can also be grouped by the business service they represent or by which traffic channel they are associated with. For example, payments over the web may be represented by a different metric that payments over the phone. If they both reference the same back-end system, then there is the opportunity to view aggregate demand on the back-end system. Similarly, grouping other web traffic with web payments and other phone metrics with phone payments may allow an estimation of demand on the front end systems where customers are interfacing with the system. This can potentially reduce the number of models and provide a more comprehensive and accurate view into where and how capacity is consumed.

Another potential improvement may be tracking model performance over time. Models that perform best in terms of actual vs forecasted may be retained in place, while underperforming models may be eliminated, or rebuilt or modified.

Multivariate and non-linear models may be used as alternate ways of modeling. Modeling the actual (not profiled) data sets for demand and component utilization may be done instead of profiled data sets. In alternate embodiments, rather than scoring and publishing the models, the regressions can be pre-run to assist with selection of components and business services to be modeled via a "self-service" portal. This would allow for a more customized approach and could free up system resources.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while a financial service provider has been referred to herein for ease of discussion, it is to be understood that consistent with disclosed embodiments another entity may provide such services in conjunction with or separate from a financial service provider.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

It is intended that the disclosure and examples be considered as exemplary only, with a true scope and spirit of disclosed embodiments being indicated by the following claims.

What is claimed is:

1. A processor-implemented computer resource metric modeling method, comprising:

aggregating transaction volume data of one or more interaction types;

aggregating resource utilization data for one or more devices;

obtaining one or more multivariate models indicative of relationships between variations in the transaction volume data and the resource utilization data;

scoring the one or more multivariate models based on a strength of the multivariate models;

mapping the one or more devices, for each interaction type, based on the scoring;

calculating diagnostic statistics for the multivariate models;

filtering out a first subset of the multivariate models based on the diagnostic statistics, with a second subset of the multivariate models remaining; and generating instructions to modify the one or more devices for load balancing based on the second subset of the multivariate models.

2. The method of claim 1, wherein the one or more interaction types includes a service provided via a mobile user device.

3. The method of claim 1, wherein the diagnostic statistics comprise at least one of a slope value, an intercept value, an $R^2$ fit value, or a root-mean-squared error (RMSE) value.

4. The method of claim 1, wherein the one or more devices include one or more servers providing a service related to the one or more interaction types.

5. The method of claim 1, further comprising detecting statistical trends in the transaction volume data and the resource utilization data via multivariate adaptive statistical filtering.

6. The method of claim 1, wherein a multivariate model of the multivariate models is generated for a group of the one or more devices, each group of one or more devices being associated with a traffic channel.

7. The method of claim 1, wherein the resource utilization data further comprises at least one of a disk utilization data, a memory utilization data, or a network utilization data.

8. The method of claim 1, further comprising:

generating weekly profiles for the one or more devices, the weekly profiles comprising at least one of an average resource utilization value, a maximum resource utilization value, or a minimum resource utilization value plotted against each day of a week.

9. The method of claim 8, further comprising:

comparing the weekly profiles; and detecting redundant devices based on the comparison.

10. The method of claim 1, further comprising:

detecting an actual relationship between variations in user demand for the interaction type and the resource utilization data;

comparing the actual relationship to the one or more multivariate models over time; and modifying the second subset of the multivariate models based on the comparison.

11. A computer resource metric modeling system, comprising:

at least one memory storing instructions; and at least one processor executing the instructions to perform operations comprising:

aggregating transaction volume data of one or more interaction types;

aggregating resource utilization data for one or more devices;

obtaining one or more multivariate models indicative of relationships between variations in the transaction volume data and the resource utilization data;

scoring the one or more multivariate models based on a strength of the multivariate models;

mapping the one or more devices, for each interaction type, based on the scoring calculating diagnostic statistics for the multivariate models;

filtering out a first subset of the multivariate models based on the diagnostic statistics, with a second subset of the multivariate models remaining; and generating instructions to modify the one or more devices for load balancing based on the second subset of the multivariate models.

12. The system of claim 11, wherein the one or more interaction type includes a service provided via a mobile user device.

13. The system of claim 11, wherein the diagnostic statistics comprises at least one of a slope value, an intercept value, an $R^2$ fit value, or a root-mean-squared error (RMSE) value.

14. The system of claim 11, wherein the one or more devices include one or more servers providing a service related to the one or more interaction types.

15. The system of claim 11, wherein the operations further comprise detecting statistical trends in the transaction volume data and the resource utilization data via multivariate adaptive statistical filtering.

16. The system of claim 11, wherein a multivariate model of the multivariate models is generated for a group of the one or more devices, each group of one or more devices being associated with a traffic channel.

17. The system of claim 11, wherein the resource utilization data further comprises at least one of a disk utilization data, a memory utilization data, or a network utilization data.

18. The system of claim 11, wherein the operations further comprise:

generating weekly profiles for the one or more devices, the weekly profiles comprising at least one of an average resource utilization value, a maximum resource utilization value, or a minimum resource utilization value plotted against each day of a week.

19. The system of claim 18, wherein the operations further comprise:

comparing the weekly profiles; and detecting redundant devices based on the comparison.

20. The system of claim 11, wherein the operations further comprise:

detecting an actual relationship between variations in user demand for the interaction type and the resource utilization data;

comparing the actual relationship to the one or more multivariate models over time; and modifying the second subset of the multivariate models based on the comparison.

* * * * *

UNITED STATES PATENT AND TRADEMARK OFFICE
CERTIFICATE OF CORRECTION

| | |
|---|---|
| PATENT NO. | : 11,243,863 B2 |
| APPLICATION NO. | : 16/549770 |
| DATED | : February 8, 2022 |
| INVENTOR(S) | : Igor Trubin et al. |

It is certified that error appears in the above-identified patent and that said Letters Patent is hereby corrected as shown below:

In the Claims

Claim 11, Column 14, Line 9, "scoring" should read as --scoring;--.

Signed and Sealed this
Tenth Day of January, 2023

Katherine Kelly Vidal
*Director of the United States Patent and Trademark Office*